(No Model.)

A. A. DREUX.
EYEGLASS FRAME.

No. 358,191. Patented Feb. 22, 1887.

WITNESSES:
C. Neveux
C. Sedgwick

INVENTOR:
A. A. Dreux
BY Munn & Co
ATTORNEYS.

UNITED STATES PATENT OFFICE.

ALFRED ALEXANDRE DREUX, OF ANGERS, FRANCE, ASSIGNOR TO JOSEPH B. LAURENCOT, OF NEW YORK, N. Y.

EYEGLASS-FRAME.

SPECIFICATION forming part of Letters Patent No. 358,191, dated February 22, 1887.

Application filed September 21, 1886. Serial No. 214,195. (No model.) Patented in France March 17, 1885, No. 167,608.

*To all whom it may concern:*

Be it known that I, ALFRED ALEXANDRE DREUX, of Angers, France, have invented a new and useful Improvement in Eyeglass-Frames, (patented in France March 17, 1885, No. 167,608,) of which the following is a specification, reference being had to the annexed drawings, forming a part thereof, in which—

Figure 1:
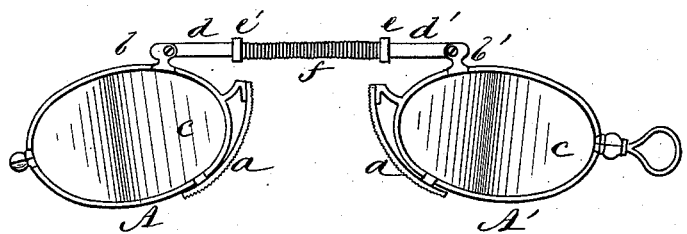
Figure 2:
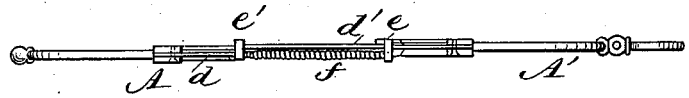

Figure 1 is a front elevation of my improved eyeglass-frame. Fig. 2 is a plan view.

Similar letters of reference indicate corresponding parts in both figures of the drawings.

Cylinder-eyeglasses, when mounted in an eyeglass-frame of the ordinary construction, having the two lens-holding frames connected by means of the flat nose-spring, are liable to be frequently placed in position for use with the axis of the cylinder-lens turned out of the parallel with the axis of the lenses of the eyes to which they are attached.

The object of my invention is to obviate these difficulties by providing means for causing the two lens-holding frames to preserve their parallelism as they are separated or allowed to approach each other.

My invention consists in a pair of parallel bars each provided with a loop for receiving the other, and a spiral spring surrounding one of the bars between the loops, the outer end of each bar being attached to a frame in which is carried a lens.

The frames A A' are of the usual form and construction, being provided with the roughened nose-pieces $a$ and with the bolsters $b\ b'$. The frames A A' are adapted to receive the eyeglasses $c$ in the usual way. To the bolsters $b\ b'$ are secured the bars $d\ d'$, which overlap each other, the bar $d$ being provided at its extremity with an eye, $e$, for receiving the bar $d'$, the bar $d'$ being provided with an eye, $e'$, for receiving the bar $d$. Upon the bar $d$, and between the eyes $e\ e'$, is placed a spiral spring, $f$, which is flattened to cause it to closely envelop the bar $d$. The spring $f$ is constantly under compression, so that it tends to separate the eyes $e\ e'$ to cause the bars $d\ d'$ to overlap each other more and to draw together the eyeglass-frames A A'. By this construction the lenses C always remain parallel with each other without regard to the distance between them, and uniformity and accuracy of adjustment of the eyeglasses to the eye is automatic.

In the drawings I have represented the bars $d\ d'$ as lying in the plane of the frames A A'; but by giving the bars sufficient thickness they may be arranged flatwise or at right angles with the frames A A', thus giving them more nearly the appearance of an ordinary eyeglass-frame.

Having thus described my invention, what I claim as new, and desire to secure by Letters Patent, is—

In eyeglasses, the combination, with the lens-holding frames A A', of the straight bars $d\ d'$, rigidly secured to the frames, and each provided with an eye for receiving the other bar, the said bars being arranged to overlap each other from their point of attachment with the frames to their extremities, and a spiral spring on one of the bars interposed between the eyes of the said bars, substantially as described, whereby provision is made for always retaining the parallelism of the lenses, as set forth.

ALFRED ALEXANDRE DREUX.

Witnesses:
P. CHAUMIER,
P. BOSSÉ.